United States Patent [19]

Kiriyama et al.

[11] Patent Number: 5,013,768
[45] Date of Patent: May 7, 1991

[54] PHOTOPOLYMERIZABLE COATING COMPOSITION AND PROCESS FOR FORMING A COATING HAVING A STEREOSCOPIC PATTERN

[75] Inventors: Yoshiyuki Kiriyama, Kobe; Kazuyuki Moriga, Ibaraki; Toshio Shinohara, Kyoto; Mitsuhiro Matsuda, Ibaraki; Hiromi Maeda, Akashi, all of Japan

[73] Assignee: Dai Nippon Toryo Co., Ltd., Osaka, Japan

[21] Appl. No.: 152,587

[22] Filed: Dec. 19, 1989

[51] Int. Cl.$^5$ .............................. C08F 2/44; C08F 2/50; C08F 122/22
[52] U.S. Cl. .............................. 522/64; 522/77; 522/81; 523/300; 524/847; 526/95; 526/108; 526/191; 526/203; 526/221; 526/226
[58] Field of Search ........................ 522/77, 81, 64, 64, 522/77, 81

[56] References Cited

U.S. PATENT DOCUMENTS 4,024,296  5/1977  Gruber .................................. 522/81
4,447,520  5/1984  Henne et al. ......................... 522/64

FOREIGN PATENT DOCUMENTS 0079275  4/1987  Japan.
0218703  9/1988  Japan.

Primary Examiner—Marion E. McCamish
Assistant Examiner—Susan Berman
Attorney, Agent, or Firm—Oblon, Spivak, McClelland, Maier & Neustadt

[57] ABSTRACT

A photopolymerizable coating composition comprising:
(A) 100 parts by weight of a vehicle consisting essentially of a urethaneacrylate oligomer;
(B) from 0.1 to 5 parts by weight of an acylphosphine oxide compound as a photoinitiator;
(C) from 1 to 100 parts by weight of a color pigment; and
(D) from 20 to 300 parts by weight of a transparent glass powder having an average particle size of not larger than 100 μm and an index of refraction which does not differ more than 0.3 from the index of refraction of the composition excluding the color pigment.

10 Claims, No Drawings

PHOTOPOLYMERIZABLE COATING COMPOSITION AND PROCESS FOR FORMING A COATING HAVING A STEREOSCOPIC PATTERN

BACKGROUND OF THE INVENTION

1. Field of the Invention

The present invention relates to a photopolymerizable coating composition containing a color pigment, which is ultraviolet curable and which is capable of providing a coating layer excellent in the abrasion resistance and water resistance, and a process for forming a coating of a stereoscopic pattern by using such a composition.

2. Discussion of Background

In recent years, photopolymerizable coating compositions containing no solvent or little organic solvent have been employed in view of social demands for conservation of resources and pollution free operation. However, conventional photopolymerizable coating compositions are mainly of a clear type containing no color pigment. An enamel type composition containing a color pigment is practically used only in a limited area since the coating thickness is limited, and its commercial development is stalemated.

As mentioned above, a photopolymerizable coating composition containing a color pigment has a difficulty in that when coated in a substantial thickness, ultraviolet rays will not sufficiently be transmitted to the interior of the coating layer, whereby inadequate curing will result, and wrinkles are likely to form with the curing of only the surface of the layer, thus leading to a poor outer appearance of the coating layer Further, the coating efficiency used to be poor.

Under these circumstances, it has been proposed to use as the color pigment a pigment which hardly absorbs ultraviolet rays, or to use a highly reactive photopolymerizable compound, or to use as the ultraviolet lamp a lamp capable of emitting light rays of long wavelengths. However, in either proposal, the coating thickness is limited to a level of at most 30 $\mu$m. If the thickness exceeds this limit, defective curing tends to result, and the coloring power and the opacifying power tend to be poor as compared with usual enamels.

Further, it has been recently proposed to incorporate spherical glass particles to a photopolymerizable coating composition containing a color pigment (e.g. Japanese Unexamined Patent Publication No. 79275/1987). By this method, it is possible to obtain a coating layer having the curability improved to some extent. However, the composition is inferior in the water resistance and exhibits poor curability by light rays with short wavelengths.

On the other hand, as photoinitiators to be used for photopolymerizable coating compositions, benzophenone, acetophenone, diethoxyacetophenone, chloroacetophenone, 2,2-dimethoxy-2-phenylacetophonone, propiophenone, thioxanthone, benzoin, benzyl, anthraquinone, benzylketal, benzoin ethyl ether, benzoin isopropyl ether and dimethoxyphenyl are known as typical examples (U.S. patent application Ser. Nos. 129,297, 731,888 and 757,249). However, photoinitiators commonly employed including those mentioned above, are incapable of sufficiently curing the coating layers to the inside thereof if the photopolymerizable coating compositions containing them contain a substantial amount of an opacifying component such as a color pigment.

Further, acylphosphine oxide compounds have been developed as photoinitiators (U.S. Pat. Nos. 4,292,152 and 4,385,109). These compounds are excellent in the photosensitivity as compared with the above-mentioned photoinitiators and capable of forming cured coating layers even when used for photopolymerizable coating compositions containing color pigments. However, the coating thickness is still limited to a level of at most a few tens $\mu$m. If the coating thickness is at a level of a few hundreds $\mu$m, the inside of the coating layer will not sufficiently be cured. Further, even in a case of a thin coating layer, if a large amount of a color pigment is incorporated to increase the opacifying power, the curability tends to be poor, and the resulting coating layer tends to be inferior in the water resistance, etc.

In the fields of interior decorating materials or building materials, it has been common to employ materials having stereoscopic colorful patterns applied to present a beautiful outer appearance. Such stereoscopic colorful patterns are usually applied by forming multiple coating layers of different colors by (i) a gravure, offset or offset gravure printing method, (ii) a screen printing method or (iii) a coating method, or by a combination of these methods. However, it is common to use an organic solvent for the coating material or for an ink used for such methods.

On the other hand, in view of the social demands for pollution free operation and conservation of resources, there has been in recent years a tendency of adopting a photopolymerizable coating composition containing no solvent or a less amount of an organic solvent. Therefore, it is conceivable to use a photopolymerizable coating composition containing no or little organic solvent, as the coating composition for forming such a stereoscopic colorful pattern. However, when such a photopolymerizable coating composition is to be used as a coating composition for forming a stereoscopic colorful pattern by multiple coating layers, the coating composition is required to satisfy the following conditions:

(1) It provides good intercoat adhesion when multiple coating layers are formed.

(2) It provides consistent curability within a wide light energy range.

(3) It provides constant curability even when the coating layer thickness varies.

(4) It is capable of maintaining the initial color of coating, which is not affected even when irradiated several times with ultraviolet rays.

However, none of the conventional photopolymerizable coating compositions fully satisfies these conditions. Therefore, stereoscopic colorful patterns formed by colored photopolymerizable coating compositions have not substantially practically used.

Namely, when a stereoscopic colorful pattern is formed by multiple coating layers, the coating layer formed first i.e. the undercoating layer, is exposed several times to ultraviolet rays and accordingly will be in an overcured state, whereby it is likely that the intercoat adhesion deteriorates or the layer undergoes a color change.

Further, the light emitting element of the ultraviolet curing apparatus is usually a tubular lamp, and the intensity of lights of the lamp in the parallel direction is not constant. Particularly, the intensity of lights is low in the vicinity of the electrodes. Further, the light intensity tends to decrease by the deterioration with time of the lamp. Under these conditions, the coating layer is likely to have a partial curing defect, and a color change is likely to take place. Further, in the case of ultraviolet curing, ultraviolet rays enter from the surface of the coating layer and reach to the boundary of the coating layer with the substrate to complete the curing reaction However, it is usual that the thickness of the coating layer varies depending upon the nature of the coating composition such as the viscosity, the coating or printing conditions or the surface conditions of the substrate such as the surface roughness of the substrate or the penetrability of the coating composition. Consequently, it is likely that there will be some portions deep in the coating layer where the curing reaction is partially inadequate, and adhesion defects, blisters or wrinkles are likely to result.

SUMMARY OF THE INVENTION

It is an object of the present invention to overcome the drawbacks of the conventional techniques and to provide a photopolymerizable coating composition which is adequately curable by ultraviolet radiation even when applied in a substantial thickness (e.g. a few hundreds μm) to provide a coating layer which is excellent in the abrasion resistance, impact resistance, scratching resistance, flame retardancy, adhesion and water resistance and which is capable of providing a coating layer having high opacifying power even in a thin layer since a color pigment can be incorporated in a large amount.

It is another object of the present invention to provide a process for forming a coating having a stereoscopic pattern, whereby a stereoscopic pattern composed of multiple coating layers can be formed with good intercoat adhesion and in a short period of time by using certain specific colored photopolymerizable coating compositions.

The present invention provides a photopolymerizable coating composition comprising:

(A) 100 parts by weight of a vehicle consisting essentially of a urethaneacrylate oligomer;

(B) from 0.1 to 5 parts by weight of an acylphosphine oxide compound as a photoinitiator;

(C) from 1 to 100 parts by weight of a color pigment; and (D) from 20 to 300 parts by weight of a transparent glass powder having an average particle size of not larger than 100 μm and an index of refraction which does not differ more than 0.3 from the index of refraction of the composition excluding the color pigment.

The present invention further provides a process for forming a coating having a stereoscopic pattern, which comprises (a) forming a colored undercoating layer on a substrate by coating the photopolymerizable coating composition containing a color pigment over the entire surface or a part of the surface of the substrate followed by irradiation with ultraviolet rays, and (b) forming a colored overcoating layer on the undercoating layer by coating the photopolymerizable coating composition containing a color pigment having a color which is the same or different from the color of the photopolymerizable coating composition for the undercoating layer, partially on the undercoating layer, followed by irradiation with ultraviolet rays.

DETAILED DESCRIPTION OF THE PREFERRED EMBODIMENTS

Referring to component (A), the vehicle consists essentially of a urethaneacrylate oligomer. The urethaneacrylate oligomer includes broadly those having an urethane bond and a radical polymerizable unsaturated double bond in their molecules and having an average molecular weight of from a few hundreds to a few tens thousands, which are viscous at room temperature.

For example, in addition to an oligomer obtainable by the reaction of a polyisocyanate with a (meth)acrylate having a hydroxyl group, a polyether type urethaneacrylate oligomer, a polyester type urethaneacrylate oligomer and a polybutadiene type urethaneacrylate oligomer may be mentioned. Specifically, it may be a reaction product of toluene diisocyanate, hexamethylene diisocyanate, isophorone diisocyanate, diphenylmethane diisocyanate, xylene diisocyanate, an isomer thereof, or a polyisocyanate (particularly preferably a non-yellowing type polyisocyanate) such as an isocyanate-terminated compound as a reaction product of an excess polyisocyanate with a polyhydric alcohol such as a polyester polyol, polyoxymethylene glycol, polyoxyethylene glycol, polyoxypropylene glycol, caprolactone polyol, trimethylolpropane or pentaerythritol, with a compound having a hydroxyl group and an unsaturated group. As such a compound having a hydroxyl group and an unsaturated group, hydroxypropyl (meth)acrylate, hydroxybutyl (meth)acrylate, hydroxyethyl (meth)acrylate or glycidyl (meth)acrylate may be mentioned as typical examples. A number of vehicles are known to be useful for photopolymerizable coating compositions. Among them, a urethaneacrylate oligomer having good interlayer adhesion is used in the present invention.

The vehicle is composed of such a urethaneacrylate oligomer and a reactive diluent. As such a reactive diluent, 2-ethylhexyl (meth)acrylate, 2-hydroxyethyl (meth)acrylate, isobornyl (meth)acrylate, tripropylene glycol diacrylate, 1,6-hexanediol diacrylate, tetraethylene glycol diacrylate, trimethylolpropane tri(meth)acrylate, pentaerythritol tetra(meth)acrylate, ditrimethylolpropane pentaacrylate, dipentaerythritol hexaacrylate, vinyl acetate, N-vinylpyrrolidone, dimethyl (meth)acrylamide, vinyltoluene and divinylbenzene may be mentioned as typical examples. Such a reactive diluent is incorporated in an amount of from 10 to 100 parts by weight relative to 100 parts by weight of the urethaneacrylate oligomer.

Referring to component (B), an acylphosphine oxide compound is used as the photoinitiator. The acylphosphine oxide compound may be a compound of the formula I as disclosed in e.g. U.S. Pat. No. 4,385,109:

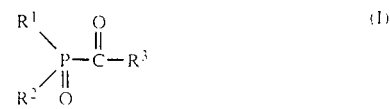

wherein $R^1$ is alkyl of 1 to 6 carbon atoms, cycloalkyl of 5 or 6 ring carbon atoms, aryl which is unsubstituted or substituted by halogen, alkyl or alkoxy, or a S-containing or N-containing five-membered or six-membered heterocyclic radical, $R^2$ has one of the meanings of $R^1$, but $R^1$ and $R^2$ may be identical or different, or is alkoxy, aryloxy or aralkoxy, or $R^1$ and $R^2$ together form a ring, and $R^3$ is tertiary alkyl of 4 to 18 carbon atoms or tertiary cycloalkyl of 5 or 6 ring carbon atoms or is a cycloalkyl, aryl or 5-membered or 6-membered heterocyclic radical which contains substituents A and B at least in the two positions ortho to the carbonyl group, A and B being identical or different and each being alkyl, alkoxy, alkoxyalkyl, alkylthio, cycloalkyl, aryl or halogen.

The phrase "which contains substituents A and B in the two positions ortho to the carbonyl group" means that the substituents A and B are bonded to the two ring carbon atoms, capable of substitution, which are adjacent to the point of attachment of the carbonyl group. This means that the α-naphthyl radical contains the substituents A and B at least in the 2- and 8-positions and the β-naphthyl radical at least in the 1- and 3-positions. In the cyclohexyl radical, the substituents A and B are in the 2- and 6-positions, and in the cyclopentyl radical in the 2- and 5-positions.

Examples of suitable acrylphosphine oxide compounds of the formula I for use in the compositions according to the invention are: 2,2-dimethyl-propionyl-diphenylphosphine oxide, 2,2-dimethyl-heptanoyldiphenylphosphine oxide, 2,2-dimethyl-octanoyldiphenylphosphine oxide, 2,2-dimethyl-nonanoyldiphenylphosphine oxide, methyl 2,2-dimethyl-octanoyl-phenylphosphinate, 2-methyl-2-ethyl-hexanoyldiphenylphosphine oxide, 1-methyl-1-cyclohexanecarbonyldiphenylphosphine oxide, 2,6-dimethylbenzoyldiphenylphosphine oxide, 2,6-dimethoxybenzoyldiphenylphosphine oxide, 2,6-dichlorobenzoyldiphenylphosphine oxide, methyl 2,6-dimethoxybenzoylphenylphosphinate, 2,4,6-trimethylbenzoyldiphenylphosphine oxide, methyl 2,4,6-trimethylbenzoylphenylphosphinate, 2,3,6-trimethylbenzoyldiphenylphosphine oxide, 2,3,5,6-tetramethylbenzoyldiphenylphosphine oxide, 2,4,6-trimethoxybenzoyldiphenylphosphine 2,4,6-trichlorobenzoyldiphenylphosphine oxide, 2-chloro-6-methylthio-benzoyldiphenylphosphine oxide, methyl 2,4,6-trimethylbenzoylnaphthylphosphinate, 1,3-dimethoxynaphthalene-2-carbonyldiphenylphosphine oxide, 2,8-dimethoxynaphthalene-1-carbonyl-diphenylphosphine oxide, 2,4,6-trimethylpyridine-3-carbonyl-diphenylphosphine oxide, 2,4-dimethylquinoline-3-carbonyl-diphenylphosphine oxide, 2,4-dimethoxyfuran-3-carbonyl-diphenylphosphine oxide and methyl 2,4-dimethylfuran-3-carbonyl-phenylphosphine.

The acrylphosphine oxide compound is incorporated in an amount of from 0.1 to 5 parts by weight, preferably from 0.2 to 3 parts by weight, relative to 100 parts by weight of the vehicle of component (A).

In some cases, conventional photoinitiators may be used in combination with the acylphosphine oxide compound as the photoinitiator of the present invention.

Referring to component (C), usual inorganic and organic pigments and dyestuffs may be used as the color pigment for the present invention. Specifically, titanium oxide, zinc sulfide, zinc white, white lead, lithopone, carbon black, lampblack, Berlin blue, phthalocyanine blue, ultramarine, carmine FB, chrome yellow, zinc yellow, Hanza Yellow, ochre, iron oxide red and an insoluble metal-containing azo dye may be mentioned as typical examples. In the present invention, zinc sulfide, lampblack, ultramarine, phthalocyanine blue, carmine FB, chrome yellow, ochre, iron oxide red and an insoluble metal-containing azo dye are particularly suitable as they have relatively small ultraviolet absorptivity.

Further, when it is desired to impart a metallic appearance to the coating layer, a flaky metallic pigment, such as aluminum powder, copper powder, stainless steel powder, mica powder, graphite powder or a plastic powder having gold, silver, copper or the like vapor-deposited thereto, may be used as the color pigment.

Likewise, when it is desired to impart a colorful dot appearance to the coating layer, a colored powder coating material, colored plastic particles, colored silica sand or colored pottery stone powder, may be used as the color pigment.

Further, when it is desired to impart electrical conductivity to the coating layer, a powder of a metal such as gold, silver, copper, nickel or an alloy thereof, a powder of carbon black such as graphite, or a powder of an oxide, nitride or carbide of an element such as tin, titanium, zinc, aluminum, silicon, antimony or indium, may be employed as the color pigment.

Such a color pigment is incorporated in an amount of from 1 to 100 parts by weight, preferably from 1.5 to 85 parts by weight, relative to 100 parts by weight of the vehicle of component (A). The amount of the color pigment is usually not higher than 40% by weight in the formed coating layer, and the lower limit may optionally be determined depending upon the desired opacifying power or coloring power of the coating layer.

As an extender pigment which may be incorporated as the case requires, silica sand, silicate, talc, kaolin, barium sulfate, calcium carbonate, flaky, fibrous or hollow glass and a powder of a resin such as polyurethane, polyester, polyethylene or polystyrene, may be mentioned as typical examples.

Referring to component (D), the transparent glass powder has a function to impart abrasion resistance to the formed coating layer and a function to conduct the light energy to the interior of the coating layer, whereby it is possible to form a thick coating layer. Further, even in the case of a thin coating layer, it is thereby possible to incorporate a large amount of the color pigment, whereby it is possible to form a coating layer having a high opacifying power.

In order to obtain the above-mentioned functions, the glass powder is required to satisfy the following conditions:

(a) The average particle size is not more than 100 μm, preferably from 3 to 60 μm. Even if the average particle size exceeds 100 μm, there is no substantial effect to the curability of the coating layer, but the glass powder is distinctly observed in the formed layer, and the surface roughness may result, such being undesirable from the viewpoint of the appearance of the coating layer. Further, there will be a deterioration of the physical properties such as tensile strength. On the other hand, there is no particular restriction as to the lower limit of the particle size. However, the transmittance tends to substantially decrease, and therefore, the average particle size should preferably be within the above-mentioned range.

(b) The index of refraction of the glass powder does not differ more than 0.3 from the index of refraction of the clear coating layer of the photopolymerizable coating composition excluding the color pigment. If the difference in the index of refraction exceeds 0.3, the light energy for curing the coating layer will substantially be attenuated inside the coating layer when the coating layer is thick, whereby curing defect is likely to result.

When a coating film as thick as from a few tens μm to a few hundreds μm is to be formed, the glass powder is preferably spherical. Whereas, in a case where a thin coating layer at a level of a few μm to a few tens μm is to be formed, the glass powder is preferably non-specific shape.

There is no particular restriction as to the glass powder to be used in the present invention, so long as the above conditions are satisfied.

The index of refraction $N_D$ of a clear coating layer of a photopolymerizable composition is usually from about 1.4 to 1.6. Accordingly, soda-lime glass, soda lime.lead glass, potassium.lead glass, potassium.lead glass, potassium.soda.lead glass, borosilicate glass, high alumina glass and potassium.soda.barium glass having an index of refraction $N_D$ of about 1.5 may be mentioned as specific examples. However, the useful glass powder is not limited to such specific examples.

The glass powder is incorporated usually from 20 to 300 parts by weight, preferably from 30 to 200 parts by weight, relative to 100 parts by weight of the vehicle of component (A). The amount is usually from 20 to 80% by weight in the formed coating layer. Particularly in the case of a single coating layer having a thickness as thick as at least 100 μm, the amount of the glass powder is suitably from 30 to 70% by weight in the coating layer.

Further, a solvent is usually employed to adjust the viscosity for coating or printing. As such a solvent, toluene, xylene, acetone, methyl ethyl ketone or ethyl acetate may be mentioned as a typical example.

The colored photopolymerizable coating composition to be used in the present invention comprises the above described components.

The photopolymerizable coating composition of the present invention is coated or printed on a substrate by using a usual coating or printing means and then ultraviolet rays are irradiated to induce the photopolymerization reaction to cure the coating layer.

As the light source to be used for the irradiation of ultraviolet rays, a low pressure mercury lamp, a high pressure mercury lamp, a metal halide lamp, a carbon arc lamp, a xenon lamp or a chemical lamp may be used.

The substrate to be coated may be of various types including metal, wood, plastic, glass, porcelain, concrete and paper substrates. Since it is possible to obtain a coating layer particularly excellent in the abrasion resistance, impact resistance, scratching resistance, flame retardancy and sound-shielding, the composition of the present invention is useful particularly for interior decoration of buildings. Further, such a substrate may be the one subjected to preliminary treatment such as filling treatment, sanding treatment or coloring treatment, or may be the one having an uneven surface.

Now, a process for forming a coating having a stereoscopic pattern according to the present invention will be described.

On the surface of a substrate as described above, the above-mentioned colored photopolymerizable coating composition to form a colored undercoating layer is coated or printed partially or entirely by a coating means such as a flow coater, a roll coater, a spray gun or a pattern roller, or by a printing means such as gravure, offset, offset gravure or screen printing.

Then, ultraviolet rays are irradiated to cure the colored undercoating layer.

In the case of a thick layer (e.g. from 100 to 500 μm), the ultraviolet irradiation is conducted at a power input of at least 80 W/cm, preferably at least 120 W/cm. As the light source, the above-mentioned metal halide lamp is particularly suitable. After curing the colored undercoating layer, the above-mentioned colored photopolymerizable coating composition having a color which is the same or different from the color of the undercoating layer is coated or printed by the same means as described above partially on the undercoating layer and/or on the surface of the substrate where no undercoating layer has been applied.

Then, ultraviolet rays are irradiated to cure the colored overcoating layer. A multi-layered coating thus obtained has a stereoscopic pattern. When the colors of the respective layers are different, a stereoscopic multicolored pattern will be formed.

The process for forming a coating having a stereoscopic pattern has been described with respect to a double-layered coating of a stereoscopic pattern. However, the coating may be a three or more multi-layered coating with a stereoscopic pattern. Further, a colored or colorless clear coating layer may be applied as the outermost coating layer.

As described in the foregoing, the photopolymerizable coating composition of the present invention contains the above-mentioned specific vehicle component, the specific photoinitiator and the specific glass powder, and it is adequately curable with ultraviolet rays even in a thick coating layer at a level of a few hundreds pm (e.g. 500 μm), which used to be impossible in the case where a color pigment was incorporated. Thus, it is possible to form a thick coating layer, which has high opacifying power and coloring power. Therefore, the composition is epoch-making from the practical viewpoint. Further, in a case of a thin coating layer at a level of from a few μm to a few tens μm, the color pigment can be incorporated in a large amount, whereby it is possible to obtain a coating layer having a high opacifying power. Furthermore, since the glass powder is incorporated, the formed coating layer is excellent in the abrasion resistance, impact resistance, scratching resistance, flame retardancy, sound-shielding and adhesion. When subjected to ultraviolet irradiation, no heat will be created. Therefore, the present invention is applicable also to a substrate which is generally weak to heat, and it is thereby possible to prevent formation of wrinkles on the coating layer due to heat. Further, even when a stereoscopic pattern is formed by multiple coating layers, the intercoat adhesion is excellent, and the composition has a constant curability within a wide light energy range, whereby it is possible to obtain a coating with a stereoscopic pattern in a short period of time and with a high coating performance.

Now, the present invention will be described in further detail with reference to Examples. However, it should be understood that the present invention is by no means restricted by such specific Examples. In the Examples, "parts" and "%" mean "parts by weight" and "% by weight".

Preparation of urethaneacrylate oligomer (I)

One mole of isophorone diisocyanate and 2 mols of 2-hydroxyethyl acrylate were subjected to addition reaction by a usual method to obtain urethaneacrylate oligomer (I) having an average molecular weight of about 500.

Preparation of urethaneacrylate oligomer (II)

2.1 Mols of 1,6-hexanediol, one mol of ethylene glycol and 2.4 mols of adipic acid were subjected to condensation reaction to obtain a polyester having a molecular weight of about 1,000. One mol of this polyester, 2 mols of isophorone diisocyanate and 2 mols of 2-hydroxyethyl acrylate were subjected to addition reaction by a usual method to obtain polyester-type urethaneacrylate oligomer (II) having an average molecular weight of about 1,700.

Preparation of epoxyacrylate oligomer (III)

One mol of a bisphenol A type diepoxy compound (Epikote 828, tradename, manufactured by Yuka Shell Epoxy Co., molecular weight: about 380) and 2 mols of acrylic acid were subjected to addition reaction by a usual method to obtain epoxyacrylate oligomer (III) having an acid value of 20.

Preparation of unsaturated polyester (IV)

One mol of maleic anhydride, one mol of phthalic anhydride and 2.1 mols of 1,2-propylene glycol were subjected to condensation reaction by a usual method to obtain an unsaturated polyester having an acid value of 45 and an average molecular weight of about 8,000.

EXAMPLE 1

A photopolymerizable coating composition having the following blend composition was applied to a black-colored hard vinyl chloride resin plate by a 3 mil applicator and subjected to flash-off at 60° C for one minute. Then, ultraviolet rays were irradiated for 2 seconds from a distance of 15 cm by a Fe.Sn halide lamp with 120 W/cm to cure the coating layer. The obtained coating layer was tested for its properties. The results are shown in Table 1. The refractive index $N_D$ of the clear coating layer of the composition having the soda glass powder and the zinc sulfide pigment omitted from the blend composition, was 1.5.

| Blend composition | |
|---|---|
| Urethaneacrylate oligomer (I) | 22 parts |
| N-vinylpyrrolidone | 6 parts |
| 2,4,6-trimethylbenzoyldiphenyl-phosphine oxide | 1 part |
| Soda glass powder (transparent powder having a non-specific shape with a refractive index $N_D$ of 1.52 and an average particle size of 5 μm) | 40 parts |
| Zinc sulfide pigment | 20 parts |
| n-Butyl acetate | 11 parts |

EXAMPLE 2

A coating layer was cured in the same manner as in Example 1 except that a photopolymerizable coating composition having the following blend composition was applied by a 10 mil applicator, and the ultraviolet rays were irradiated for 2 seconds. The obtained coating layer was tested for its properties. The results are shown in Table 1. The refractive index $N_D$ of the clear coating layer of the composition having the soda glass beads and the zinc sulfide pigment omitted from the blend

| Blend composition | |
|---|---|
| Urethaneacrylate oligomer (II) | 25 parts |
| N-vinylpyrrolidone | 7 parts |
| 2,6-dimethoxybenzoyldiphenyl-phosphine oxide | 1 part |
| Soda glass beads (transparent spherical beads with a refractive index $N_D$ of 1.52 and an average particle size of 60 μm) | 55 parts |
| Zinc sulfide pigment | 12 parts |

COMPARATIVE EXAMPLE 1

The coating and ultraviolet irradiation were conducted under the same conditions as in Example 1 except that instead of the soda glass powder in Example 1, a transparent lead glass powder having a non-specific shape with a refractive index $N_D$ of 2.2 and an average particle size of 5 μm was used. The obtained coating layer was tested for its properties. The results are shown in Table 1.

COMPARATIVE EXAMPLE 2

The coating and ultraviolet irradiation were conducted under the same conditions as in Example 1 except that the amount of the soda glass powder in Example 1 was changed to 10 parts. The obtained coating layer was tested for its properties. The results are shown in Table 1.

COMPARATIVE EXAMPLE 3

The coating and ultraviolet irradiation were conducted under the same conditions as in Example 1 except that the amount of the soda glass powder in Example 1 was changed to 300 parts. The obtained coating layer was tested for its properties. The results are shown in Table 1.

COMPARATIVE EXAMPLE 4

The coating and ultraviolet irradiation were conducted under the same conditions as in Example 2 except that in Example 2, soda glass beads having an average particle size of 111 pm were used. The obtained coating layer was tested for its properties. The results are shown in Table 1.

COMPARATIVE EXAMPLE 5

The coating and ultraviolet irradiation were conducted under the same conditions as in Example 1 except that instead of the soda glass powder in Example 1, calcium carbonate was used as an extender pigment. The obtained coating layer was tested for its properties. The results are shown in Table 1.

COMPARATIVE EXAMPLE 6

The coating and ultraviolet irradiation were conducted under the same conditions as in Example 1 except that in Example 1, the zinc sulfide pigment was omitted, and instead of the glass powder, calcium carbonate was used as an extender pigment. The obtained coating layer was tested for its properties. The results are shown in Table 1. The obtained coating layer was a clear coating layer having turbidity.

COMPARATIVE EXAMPLE 7.

The coating and ultraviolet irradiation were conducted under the same conditions as in Example 1 except that instead of 2,4,6-trimethylbenzoyldiphenylphosphine oxide in Example 1, an acetophenone photoinitiator was used. The obtained coating layer was tested for its properties. The results are shown in Table 1.

COMPARATIVE EXAMPLE 9

A coated plate was prepared in the same manner as in Example 3 except that the soda glass beads were omitted.

TABLE 1

|  | Example No. | | Comparative Example No. | | | | | | |
| --- | --- | --- | --- | --- | --- | --- | --- | --- | --- |
|  | 1 | 2 | 1 | 2 | 3 | 4 | 5 | 6 | 7 |
| Appearance of coating layer[1] | O | O | O | O | X | Δ | O | O | O |
| Abrasion resistance[2] | 350< | 350< | 350 | 100 | 350< | 350< | 100 | 100 | 350< |
| Adhesion[3] | 100/100 | 100/100 | 50/100 | 50/100 | 85/100 | 100/100 | 80/100 | 100/100 | 50/100 |
| Impact resistance[4] | 50 cm< | 50 cm< | 40 cm | 10 cm | 10 cm | 40 cm | 10 cm | 10 cm | 30 cm< |
| Water resistance[5] | O | O | Δ | Δ | X | O | Δ | O | Δ |

[1] Visual evaluation: O Good. Δ Roughened surface. X Roughened surface with no gloss
[2] An abrasive-coated paper was mounted on each of two rubber discs of a Taber abrader, and the abrader was operated under a total load of 1 kg, whereby the number of rotations of the discs till the coating layer was abraded to at least 50%, was taken as the abrasion resistance.
[3] Cross cut adhesion test.
[4] A drop weight of 500 g with a curvature radius of ½ inch was dropped by a Dupont tester, whereby the falling height required to form a crack by a single dropping operation, was taken as the impact resistance.
[5] The coated plate was immersed in water for one month: O No change. Δ Blistering. X Peeling.

EXAMPLE 3

A photopolymerizable coating composition having the following blend composition was applied in a thickness of 30 μm on a hard vinyl chloride resin plate by an air spray and subjected to flash-off at 60° C. for one minute. Then, the coated plate was passed under a metal halide lamp (power input: 120 W/cm) with a distance of 100 mm below the lamp at a passing speed of 15 m/min to cure the coating layer by the ultraviolet radiation.

The obtained coated plate had a silver pearl-like metallic gloss. Even after it was immersed in water for one month, no abnormality such as peeling or blistering of the coating layer, was observed. The refractive index $N_D$ of the clear coating layer of the composition having the soda glass beads and the mica powder omitted from the blend composition, was 1.5.

| Blend composition | |
| --- | --- |
| Urethaneacrylate oligomer (Unidic V4001, tradename, manufactured by Dainippon Ink Kagaku Kogyo K. K.) | 55 parts |
| Dipentaerythritol hexaacrylate | 30 parts |
| Titanium oxide-coated mica powder (Iriodin 130, tradename, E Merck Co., particle size: 15–130 μm) | 15 parts |
| Soda glass beads (transparent spherical glass particles having an average particle size of 10 μm and a refractive index $N_D$ of 1.52) | 30 parts |
| 2,6-Dichlorobenzoyl-diphenylphosphine oxide | 3 parts |
| Butyl acetate | 10 parts |

COMPARATIVE EXAMPLE 8

A coated plate was prepared in the same manner as in Example 3 except that instead of the 2,6-dichlorobenzoyl-diphenylphosphine oxide in Example 3, α,α-dimethyl-α-hydroxyacetophenone was used as the photoinitiator. The obtained coated plate had a cured coating layer having a silver pearl-like metallic gloss. However, when subjected to an immersion test in water for one month, the coating layer showed peeling and thus was poor in the water resistance. Likewise, the one wherein benzophenone was used as the photoinitiator instead of the 2,6-dichloro-benzoyl-diphenylphosphine oxide, showed peeling when it was subjected to an immersion test in water.

The coated plate thus obtained had a cured coating layer having a silver pearl-like metallic gloss. However, when subjected to an immersion test in water for one month, the coating layer showed blistering.

EXAMPLE 4

A photopolymerizable coating composition having the following blend composition was applied in a thickness of 40 μm on a soft vinyl chloride resin plate by an applicator. Then, the coated layer was passed under a metal halide lamp (power input: 120 W/cm) with a distance of 100 mm below the lamp at a passing speed of 7.5 m/min to cure the coating layer by the ultraviolet radiation.

The coated plate thus obtained was soft, but black and had excellent abrasion resistance. The surface resistance was $5 \times 10^3$ Ω/□, and thus the coating layer had excellent electrical conductivity. Even after the coated plated was immersed in water for one month, no abnormality such as blistering or peeling of the coating layer, was observed.

| Blend composition | |
| --- | --- |
| Urethaneacrylate oligomer (II) | 55 parts |
| N-vinylpyrrolidone | 32 parts |
| Nickel powder (Carbonyl nickel powder 255, tradename, Nikko Fine Product K. K., average particle size: 2.5 μm) | 70 parts |
| 2,4,6-trimethylbenzoyldiphenyl phosphine oxide | 2 parts |
| α,α-dimethyl-α-hydroxyacetophenone | 1 part |
| Soda glass beads (transparent spherical glass particles having an average particle size of 10 μm and a refractive index $N_D$ of 1.52) | 40 parts |

COMPARATIVE EXAMPLE 10

A coated plate was prepared in the same manner as in Example 4 except that the soda glass beads were omitted, and 3 parts of α,α-dimethyl-α-hydroxyacetophenone was used alone as photoinitiator.

From its appearance, the coated plate thus obtained looked cured. However, the curing was poor inside, and the coating layer was readily peeled.

EXAMPLE 5

By means of a 150 mesh direct printing screen having 100 square tile patterns with a joint width of 4 mm, the white coating composition (I) as identified below was printed in a thickness of 50 μm on a filling-treated gray slate substrate by a urethane rubber squeegee having a hardness of 82°. Then, the printed substrate was passed under a metal halide lamp (power input: 120 W/cm) with a distance of 100 mm below the lamp to cure the coating layer by ultraviolet radiation. The passing speed was 3.7 m/min, and the integrated light volume was 1000 mJ/cm$^2$ (as measured by an integrated radio meter UVPZ-1, manufactured by Eye Graphics Co.).

Then, by means of a 30 mesh direct printing screen having stripe patterns harmonized to the above 100 square tile patterns, the black coating composition (II) as identified below was printed in a thickness of 300 μm on the above screen-printed substrate by a urethane rubber squeegee having a hardness of 82°, and the coating layer was cured under the same condition as above. The finished coated substrate had a stereoscopic multi-colored pattern with white 100 square tile patterns having black stereoscopic stripe patterns on the gray joint lines.

With the coated plate, the substrate and the white coating layer, and the white coating layer and the black coating layer were completely integral, and thus the adhesion was excellent.

ΔE of the white coating layer at the position where no black coating layer was overlaid, was 0.3 before and after the irradiation of ultraviolet rays to the black coating layer, thus indicating that the white coating layer underwent no substantial discoloration.

| Colored photopolymerizable coating composition (I) | |
|---|---|
| Urethaneacrylate oligomer (I) | 22 parts |
| N-vinylpyrrolidone | 6 parts |
| 2,4,6-trimethylbenzoyldiphenyl-phosphine oxide | 0.6 part |
| Soda glass beads (transparent spherical beads having an average particle size of 10 μm and a refractive index N$_D$ of 1.52) | 40 parts |
| Zinc sulfide | 14 parts |
| Trimethylolpropane triacrylate | 17.4 parts |

The refractive index N$_D$ of the clear coating layer of the composition having the glass beads and the zinc sulfide omitted from the coating composition (I), was 1.5.

| Colored photopolymerizable coating composition (II) | |
|---|---|
| Urethaneacrylate oligomer (II) | 18.5 parts |
| 1,6-Hexanediol diacrylate | 15 parts |
| 2,6-dimethoxybenzoyldiphenyl-phosphine oxide | 0.5 part |
| Soda glass beads (transparent spherical beads having an average particle size of 30 μm and a refractive index N$_D$ of 1.52) | 55 parts |
| α,α-dimethyl-α-hydroxyacetophenone | 0.5 part |
| Calcium carbonate | 10 parts |
| Carbon black | 0.5 part |

The refractive index N$_D$ of the clear coating layer of the composition having9 the glass beads, the calcium carbonate and the carbon black omitted from the coating composition (II), was 1.5.

COMPARATIVE EXAMPLE 11

A multi-colored pattern was formed under the same conditions as in Example 5 except that in Example 5, the glass beads incorporated to the coating composition (II) were changed to calcium carbonate granules having the same particle size.

The coating layer of the black stripe patterns, cured only on its surface, and the inside was viscous and non-cured.

COMPARATIVE EXAMPLE 12

A stereoscopic multi-colored pattern was formed under the same conditions as in Example 5 except that in Example 5, the photoinitiator incorporated to the coating composition (II) was changed to α,α-dimethyl-α-hydroxyacetophenone only.

The inside of the coating layer of the black stripe patterns was not well cured, whereby the adhesion with the white undercoating layer was inferior.

COMPARATIVE EXAMPLE 13

A stereoscopic multi-colored pattern was formed under the same conditions as in Example 5 except that the urethaneacrylate oligomer (I) incorporated to the coating composition (I) was changed to the epoxyacrylate oligomer (III).

The coating layer of the black stripe patterns was readily peeled by an adhesive tape, and the recoating properties were inferior.

COMPARATIVE EXAMPLE 14

A stereoscopic multi-colored pattern was formed under the same conditions as in Example 5 except that the urethaneacrylate oligomer (I) incorporated to the coating composition (I) was changed to an unsaturated polyester (IV).

The layer of the black stripe patterns, was readily peeled by an adhesive tape, and the recoating properties were inferior.

Further, ΔE of the white coating layer before and after the irradiation of ultraviolet rays to the black coating layer, was 4.0, and the white coating layer underwent a color change to yellow.

What is claimed is:

1. A photopolymerizable coating composition comprising:
   (A) 100 parts by weight of a vehicle consisting essentially of a urethaneacrylate oligomer;
   (B) from 0.1 to 5 parts by weight of an acylphosphine oxide compound as a photoinitiator;
   (C) from 1 to 100 parts by weight of a color pigment; and
   (D) from 20 to 300 parts by weight of a transparent glass powder having an average particle size of not larger than 100 μm and an index of refraction which does not differ more than 0.3 from the index of refraction of the composition excluding the color pigment.

2. The photopolymerizable coating composition according to claim 1, wherein the glass powder has an average particle size of from 3 to 60 μm.

3. The photopolymerizable coating composition according to claim 1, wherein the vehicle consists essentially of 100 parts by weight of the urethaneacrylate oligomer and from 10 to 100 parts by weight of a reactive diluent selected from the group consisting of 2 ethylhexyl (meth)acrylate, 2-hydroxyethyl (meth)acrylate, isobornyl (meth)acrylate, tripropylene glycol diacrylate, 1,6-hexanediol diacrylate, tetraethylene glycol diacrylate, trimethylolpropane tri(meth)acrylate, pentaerythritol tetra(meth)acrylate, ditrimethylolpropane pentaacrylate, dipentaerythritol hexaacrylate, vinyl acetate, N-vinyl pyrrolidone, dimethyl (meth)acrylamide, vinyl toluene and divinylbenzene.

4. The photopolymerizable coating composition according to claim 1, wherein the acylphosphine oxide compound is a compound of the formula:

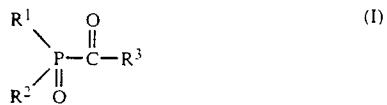 (I)

wherein $R^1$ is alkyl of 1 to 6 carbon atoms, cycloalkyl of 5 or 6 ring carbon atoms, aryl which is unsubstituted or substituted by halogen, alkyl or alkoxy, or a S-containing or N-containing five-membered or six-membered heterocyclic radical, $R^2$ has one of the meanings of $R^1$, but $R^1$ and $R^2$ may be identical or different, or is alkoxy, aryloxy or aralkoxy, or $R^1$ and $R^2$ together form a ring, and $R^3$ is tertiary alkyl of 4 to 18 carbon atoms or tertiary cycloalkyl of 5 or 6 ring carbon atoms or is a cycloalkyl, aryl or 5-membered or 6-membered heterocyclic radical which contains substituents A and B at least in the two positions ortho to the carbonyl group, A and B being identical or different and each being alkyl, alkoxy, alkoxyalkyl, alkylthio, cycloalkyl, aryl or halogen.

5. The photopolymerizable coating composition according to claim 1, wherein the color pigment is selected from the group consisting of titanium oxide, zinc sulfide, zinc white, white lead, lithopone, carbon black, lamp black, Berlin blue, phthalocyanine blue, ultramarine, carmine FB, chrome yellow, zinc yellow, Hanza Yellow, ochre, iron oxide red and an insoluble metal containing azo dye.

6. The photopolymerizable coating composition according to claim 1, wherein the color pigment is selected from the group consisting of aluminum powder, copper powder, stainless steel powder, mica powder, graphite powder and a plastic powder having gold, silver or copper vapor-deposited thereto.

7. The photopolymerizable coating composition according to claim 1, wherein the color pigment is selected from the group consisting of colored powder coating material, colored plastic particles, colored silica sand and colored pottery stone powder.

8. The photopolymerizable coating composition according to claim 1, wherein the color pigment is an electrically conductive material selected from the group consisting of metal powder, carbon black powder and powders of oxides, nitrides and carbides of tin, titanium, zinc, aluminum, silicon, antimony and indium.

9. The photopolymerizable coating composition according to claim 1, wherein the glass powder is a powder of soda-lime glass, soda-lime.lead glass, potassium.-lead glass, potassium.soda.lead glass, borosilicate glass, high alumina glass or potassium.soda.barium glass.

10. A process for forming a coating having a stereoscopic pattern, which comprises (a) forming a colored undercoating layer on a substrate by coating a photopolymerizable coating composition of claim 1 containing a color pigment over the entire surface or a part of the surface of the substrate, followed by irradiation with ultraviolet rays, and (b) forming a colored overcoating layer on the undercoating layer by coating a photopolymerizable coating composition of claim 1 containing a color pigment having a color which is the same or different from the color of the photopolymerizable coating composition for the undercoating layer, partially on the undercoating layer, followed by irradiation with ultraviolet rays.

* * * * *

UNITED STATES PATENT AND TRADEMARK OFFICE
CERTIFICATE OF CORRECTION

PATENT NO. : 5,013,768
DATED : May 7, 1991
INVENTOR(S) : Yoshiyuki Kiriyama et al It is certified that error appears in the above-identified patent and that said Letters Patent is hereby corrected as shown below:

On the Title page, item [21], Appl. No., delete "152,587", insert --452,587--.

Signed and Sealed this

Twentieth Day of July, 1993

Attest:

MICHAEL K. KIRK

Attesting Officer

Acting Commissioner of Patents and Trademarks